United States Patent
Dupas et al.

(10) Patent No.: US 7,136,597 B2
(45) Date of Patent: Nov. 14, 2006

(54) DECISION SYSTEM FOR MODULATED ELECTRICAL SIGNALS

(75) Inventors: Arnaud Dupas, St-Michael-sur-Orge (FR); Denis Penninckx, Nozay (FR); Thierry Zami, Massy (FR)

(73) Assignee: Alcatel, Paris (FR)

( * ) Notice: Subject to any disclaimer, the term of this patent is extended or adjusted under 35 U.S.C. 154(b) by 641 days.

(21) Appl. No.: 10/238,063

(22) Filed: Sep. 10, 2002

(65) Prior Publication Data

US 2003/0053182 A1 Mar. 20, 2003

(30) Foreign Application Priority Data

Sep. 20, 2001 (FR) ................................. 01 12157

(51) Int. Cl.
*H04B 10/06* (2006.01)
(52) U.S. Cl. ................... 398/210; 398/208; 375/147
(58) Field of Classification Search ............... 398/202, 398/208, 210; 375/147, 229, 230, 268, 316, 375/317, 320; 370/252, 419, 463
See application file for complete search history.

(56) References Cited

U.S. PATENT DOCUMENTS

| | | | | |
|---|---|---|---|---|
| 3,509,279 A | * | 4/1970 | Martin et al. | ............... 375/318 |
| 5,600,679 A | | 2/1997 | Kadowaki et al. | |
| 5,729,373 A | | 3/1998 | Sakuyama | |
| 6,191,879 B1 | * | 2/2001 | Yanagisawa | ............... 398/210 |

FOREIGN PATENT DOCUMENTS

EP  0 597 632 A1  5/1994

* cited by examiner

*Primary Examiner*—Leslie Pascal
(74) *Attorney, Agent, or Firm*—Sughrue Mion, PLLC

(57) ABSTRACT

A decision system for a modulated electrical signal delivered by a converter in response to a received modulated optical signal compares the amplitude of the electrical signal to a reference level, measures an average amplitude of the electrical signal, and generates the reference level as a function of the result of such measurements so that the "reference level/average amplitude" ratio can be adjusted to a predetermined constant value different from 1. Applications include receivers for optical packet transmission systems.

15 Claims, 1 Drawing Sheet

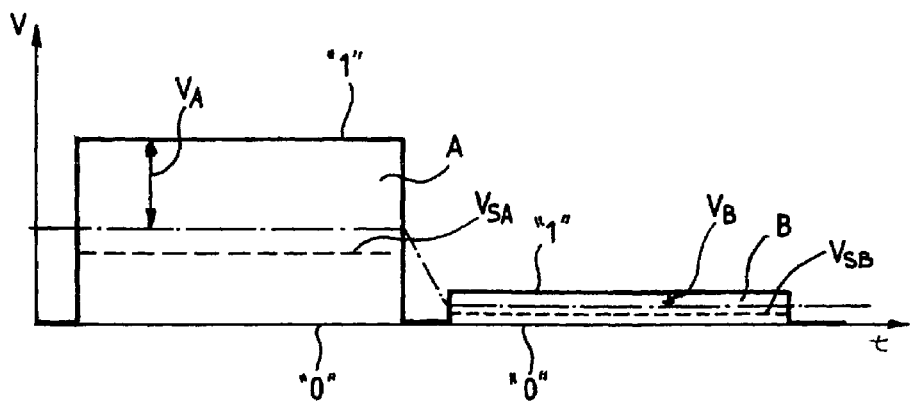
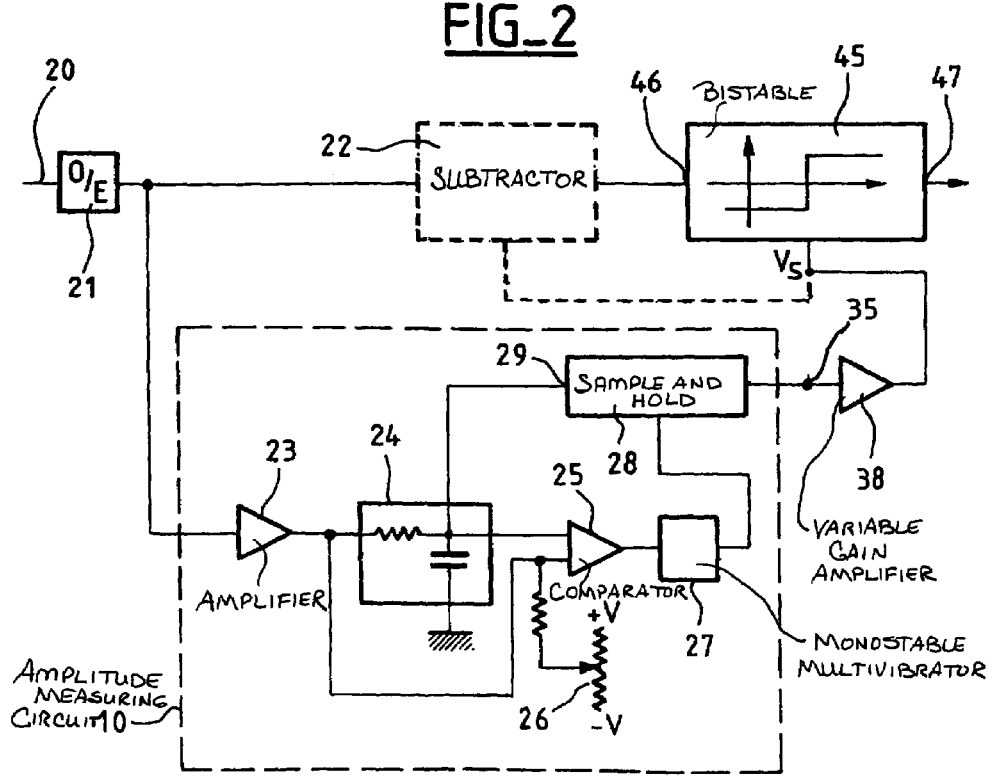

DECISION SYSTEM FOR MODULATED ELECTRICAL SIGNALS

CROSS-REFERENCE TO RELATED APPLICATIONS

This application is based on French Patent Application No. 01 12 157 filed Sep. 20, 2001, the disclosure of which is hereby incorporated by reference thereto in its entirety, and the priority of which is hereby claimed under 35 U.S.C. §119.

BACKGROUND OF THE INVENTION

1. Field of the Invention

The present invention relates to a decision system for modulated electrical signals.

To be more precise, it relates to a decision system for use in receivers for optical systems for transmitting digital signals. A system of this kind is adapted to process a modulated electrical signal obtained by converting a received modulated optical signal. The electrical signal is delivered by a converter and has an amplitude varying in response to the amplitude of the optical signal and the system comprises means for comparing the amplitude of the electrical signal to a reference level.

2. Description of the Prior Art

It is standard practice to exchange streams of optical data in continuous mode, known as continuous streams, in which information is transmitted by a signal which is continuously modulated. However, this transmission mode necessitates reshaping of the signals and leads to a loss of compactness.

To obtain an improvement in terms of shaping and compactness, and to enable all-optical switching, and therefore faster switching, at the switching nodes, exchanging data in "packet" mode has been envisaged.

When streams of optical data are exchanged in "packet" mode, the data stream consists of a large number of packets spaced from each other in time, each packet containing information necessary for sending the packet to its destination and information relating to the characteristics of the data, for example computer data, voice data, etc.

The packets received by a receiver can come from different sources and can have been routed via different optical paths, as a result of which the individual packets reaching a receiver may have different optical power levels, sometimes very different optical power levels.

When a continuous stream optical signal is converted into an electrical signal, it is standard practice to use an electrical decision system connected to a bistable to ensure fast and correct interpretation of the signal. A typical reference level is a threshold value equal to 50% of the maximum amplitude of the electrical pulses. The decision system then includes means for comparing the amplitude of the electrical signal to the reference level.

Moreover, to obtain the best bit error rate (BER), the reference level in an electrical decision system in the receiver must be optimized as a function of the degradation of the signal caused by its transmission and switching in the optical system. As a general rule, there is more noise at the higher levels of the pulses constituting digital optical signals, and a pulse of the signal is therefore considered to be a 1 if it exceeds a reference level sufficiently below the maximum amplitude. In this situation the reference level can be a fixed optimum value corresponding to a threshold 50% less than the maximum amplitude of the optical pulses.

In "packet" mode transmission the amplitude of the optical pulses, and therefore that of the electrical pulses, can vary greatly from one packet to another, and there arises the as yet unsolved problem of determining a reference level and producing a decision system that can be applied to this mode of transmission.

SUMMARY OF THE INVENTION

The invention provides a decision system for a modulated electrical signal delivered by a converter in response to a received modulated optical signal, the system including means for comparing the amplitude of the electrical signal to a reference level, means for measuring an average amplitude of the electrical signal, and means for generating the reference level as a function of the result of such measurements so that the "reference level/average amplitude" ratio can be adjusted to a predetermined constant value different from 1.

Thus the "reference level/average amplitude" ratio can be adjusted according to the particular conditions of the transmission system, the resulting reference level taking a value that remains the optimum despite the amplitude fluctuations of the optical signal.

In particular, it is possible to take account of the fact that the noise level that is superimposed on the pulses of the optical signal generally increases with the power of the high levels of the pulses, and the photodetectors usually employed to convert the optical signals into electrical signals naturally supply an electrical magnitude (current or voltage) that varies in response to the amplitude of the optical signals in accordance with an increasing function.

Accordingly, in one preferred embodiment, the amplitude of the electrical signal is an increasing function of the amplitude of the received modulated optical signal and the predetermined value is less than 1.

The invention finds a preferred application in a decision system for modulated electrical signals delivered by a converter in response to a modulated optical signal received in a "packet" mode.

In this case, the system includes means for measuring the average amplitude of each packet of the electrical signal and means for generating a reference level for each packet of the signal, the ratio being constant for all the packets of the signal.

The system preferably includes a bistable which changes state in response to a zero input voltage and, upstream of the bistable, a subtractor for subtracting from the electrical signal a voltage equal to the reference level. Thus the device is optimized for particularly fast processing.

In a preferred embodiment, the measuring means include an amplifier followed by an integrator filter having an output connected to a comparator adapted to supply an output signal to a monostable multivibrator adapted to switch a sample and hold circuit and the output of the filter is also connected to a signal input of the sample and hold circuit.

The means for generating the reference level advantageously include a variable gain amplifier adapted to receive a signal representative of the average amplitude of the electrical signal and to supply the reference level, the gain of the variable gain amplifier adjusting the "reference level/average amplitude" ratio.

The invention is described in more detail hereinafter with reference to the accompanying drawing, which shows a preferred embodiment.

BRIEF DESCRIPTION OF THE DRAWING

FIG. 1 shows two packets having different amplitudes and a gap between them.

FIG. 2 shows one embodiment of a decision system according to the invention receiving an optical signal.

DETAILED DESCRIPTION OF THE PREFERRED EMBODIMENT

FIG. 1, which has a horizontal time axis t and a vertical electrical voltage axis V, shows the envelope of an electrical signal obtained by converting an optical signal by means of a photodiode. It shows a packet A with a first average voltage level and a packet B with a second, lower average voltage level. The logic "0" levels correspond to an identical voltage for both packets, namely zero volts. On the other hand, the logic "1" levels for the two packets correspond to very different voltages. Thus, to detect the logic "1" levels of each packet by means of a reference value, different reference values must be defined for the two packets to enable a decision and correct detection.

FIG. 2 shows one embodiment of a decision system according to the invention.

An optical signal coming from an optical fiber 20, for example, is converted into an electrical magnitude by an optoelectronic converter 21, for example a 2.5 GHz photodiode. The output of the converter 21 is connected to an amplifier 23 whose output is connected via an integrator filter 24 to a circuit which detects the timing of the packet and whose main component is a comparator 25.

The signal from the output of the converter 21 is amplified by the amplifier 23 and filtered by the integrator filter 24 so that the resulting signal masks any long series of zeros contained in the packets. Such series of zeros could be interpreted as a space between packets; consequently, non-zero bits appearing thereafter could be erroneously interpreted as the starts of packets. This is prevented by the filter 24, which is a low-pass filter, for example, based on a resistor-capacitor circuit.

The filtered signal is fed to one input of the comparator 25, in which it is compared to a fixed value 26. The arrival of a packet is detected by the comparator 25 in the form of an output signal shaped by means of a monostable multivibrator 27.

The rising edge of the signal at the output of the monostable multivibrator 27 then switches a sample and hold circuit 28 to an active state for a particular time period. Because the output signal of the filter 24 is fed to the signal input 29 of the sample and hold circuit 28, a signal representative of the average value of the amplitude of the header of the packet then appears at the output 35 of the circuit 28.

By appropriately choosing the fixed value 26 and the time constant of the integrator filter 24, the samples can be taken at the start of the packets, where approximately the first 100 bits correspond to a fixed sequence, generally featuring successions of 0 and 1 bits, to enable fast synchronization. Accordingly, the sampled value depends only on the amplitude of the signal and not on the information contained in the packet.

The basic principle of this arrangement is therefore to use the header of each packet to determine the average amplitude of the complete packet.

The output signal of the circuit 28 is therefore representative of the average amplitude of the electrical signal and is fed to the input of a variable gain amplifier 38 whose output delivers a reference level Vs. Accordingly, the "reference level/average amplitude" ratio can be adjusted directly to a predetermined constant value merely by adjusting the gain of the amplifier 38.

A first option is to provide a bistable 45 with a variable threshold. In this case, the reference level Vs is applied to a threshold control input of the bistable 45, and the signal from the converter 21 is applied to a signal input 46 of the bistable having an output 47.

Another option is to provide a bistable 45 whose threshold is the zero voltage. In this case, a circuit 22 (shown in dashed outline), for removing/subtracting from the electrical signal from the optoelectronic converter 21 the voltage Vs coming from the amplifier 38, is disposed between the converter 21 and the input 46 of the bistable 45. The adjustment is effected as previously, by means of the variable gain amplifier 38.

The basic idea of the invention consists of choosing a reference level Vs such that the "reference level/average amplitude" ratio can be adjusted in accordance with the specific conditions of the transmission system to a predetermined constant value other than 1. The chosen ratio is advantageously less than 1. The ratio is constant for all the packets.

The decision system according to the invention therefore includes means 10 for measuring the average amplitude of the electrical signal and means 38 for generating a reference level Vs. To be more precise, it includes means for measuring the average amplitude of each packet of the electrical signal and means for generating a reference level for each packet.

The main electrical signals involved are shown diagrammatically in FIG. 1. Average amplitudes $V_A$ and $V_B$ of the signal from the converter 21 are measured by the circuit 10 for each packet and the amplifier 38 then generates reference levels $VS_A$ and $VS_B$ for each packet. The ratios $VS_A/V_A$ and $VS_B/V_B$ are equal and constant for all packets of the signal.

This solution can be applied for any signal format, in particular for the RZ ("return to zero") format and the NRZ ("no return to zero") format.

The invention claimed is:

1. A decision system for a modulated electrical signal delivered by a converter in response to a received modulated optical signal, said system including means responsive to the amplitude of said electrical signal and to a reference signal to produce an output, means for measuring an average amplitude of said electrical signal, and means for generating a reference level as a function of the result of such measurements and means to provide the reference signal, which use the reference level to adjust the "reference level/average amplitude" ratio to a predetermined constant value substantially different from 1, as said reference level varies proportionally to a variation of said average amplitude, and automatically maintaining said constant value.

2. The system claimed in claim 1, wherein the amplitude of said electrical signal is an increasing function of the amplitude of said received modulated optical signal and said predetermined value is substantially less than 1.

3. The system claimed in claim 1, wherein said modulated electrical signal is delivered by said converter in response to a modulated optical signal received in a "packet" mode, said system includes means for measuring an average amplitude for each packet of said electrical signal and means for generating said reference level for each packet of said signal, and said ratio is constant for all packets of said signal.

4. A decision system for a modulated electrical signal delivered by a converter in response to a received modulated optical signal, said system including means responsive to the amplitude of said electrical signal and to a reference signal to produce an output means for measuring an average amplitude of said electrical signal, and means for generating a reference level as a function of the result of such measurements, and means to provide the reference signal, which use the reference level to adjust the "reference level/average amplitude" ratio to a predetermined constant value different from 1, said system further including a bistable which changes state in response to a zero input voltage and, upstream of said bistable, a subtractor for subtracting from said electrical signal a voltage equal to said reference level.

5. The system claimed in claim 4, wherein the amplitude of said electrical signal is an increasing function of the amplitude of said received modulated optical signal and said predetermined value is less than 1.

6. The system claimed in claim 4, wherein said modulated electrical signal is delivered by said converter in response to a modulated optical signal received in "packet" mode, said system includes said means for measuring an average amplitude for each packet of said electrical signal and means for generating said reference level for each packet of said signal, and said ratio is constant for all packets of said signal.

7. A decision system for a modulated electrical signal delivered by a converter in response to a received modulated optical signal, said system including means responsive to the amplitude of said electrical signal and to a reference signal to produce and output means for measuring an average amplitude of said electrical signal, and means for generating a reference level as a function of the result of such measurements and means to provide the reference signal, which use the reference level to adjust the "reference level/average amplitude" ratio to a predetermined constant value different from 1, wherein said measuring means include an amplifier followed by an integrator filter having an output connected to a comparator adapted to supply an output signal to a monostable multivibrator adapted to switch a sample and hold circuit and the output of said filter is also connected to a signal input of said sample and hold circuit.

8. The system claimed in claim 7, wherein the amplitude of said electrical signal is an increasing function of the amplitude of said received modulated optical signal and said predetermined value is less than 1.

9. The system claimed in claim 7, wherein said modulated electrical signal is delivered by said converter in response to a modulated optical signal received in a "packet" mode, said system includes said means for measuring an average amplitude for each packet of said electrical signal and means for generating said reference level for each packet of said signal, and said ratio is constant for all packets of said signal.

10. A decision system for a modulated electrical signal delivered by a converter in response to a received modulated optical signal, said system including means responsive to the amplitude of said electrical signal and to a reference signal to produce an output, means for measuring an average amplitude of said electrical signal, and means for generating a reference level as a function of the result of such measurements, and means to provide the reference signal, which use the reference level to adjust the "reference level/average amplitude" ratio to a predetermined constant value different from 1, wherein said means for generating said reference level includes a variable gain amplifier adapted to receive a signal representative of said average amplitude of said electrical signal and to supply said reference level, the gain of said variable gain amplifier adjusting said "reference level/average amplitude" ratio.

11. A decision system for a modulated electrical signal delivered by a converter in response to a received modulated optical signal, said system including means responsive to the amplitude of said electrical signal and to a reference signal to produce an output, means for measuring an average amplitude of said electrical signal, and means for generating a reference level as a function of the result of such measurements, and means to provide the reference signal, which use the reference level to adjust the "reference level/average amplitude" ratio to a predetermined constant value different from 1, said system further including a bistable which has a variable threshold, and which changes state when the amplitude of the electrical signal changes from being above, to being below, said threshold.

12. The system claimed in claim 11, wherein the amplitude of said electrical signal is an increasing function of the amplitude of said received modulated optical signal and said predetermined value is less than 1.

13. The system claimed in claim 11, wherein said modulated electrical signal is delivered by said converter in response to a modulated optical signal received in a "packet" mode, said system includes said means for measuring an average amplitude for each packet of said electrical signal and means for generating said reference level for each packet of said signal, and said ratio is constant for all packets of said signal.

14. The system claimed in claim 11, wherein said measuring means include an amplifier followed by an integrator filter having an output connected to a comparator adapted to supply an output signal to a monostable multivibrator adapted to switch a sample and hold circuit and the output of said filter is also connected to a signal input of said sample and hold circuit.

15. The system claimed in claim 11, wherein said means for generating said reference level include a variable gain amplifier adapted to receive a signal representative of said average amplitude of said electrical signal and to supply said reference level, the gain of said variable gain amplifier adjusting said "reference level/average amplitude" ratio.

* * * * *